(12) United States Patent
Klassen et al.

(10) Patent No.: US 6,776,465 B2
(45) Date of Patent: Aug. 17, 2004

(54) SWITCHGEAR CABINET WITH A RACK AND PANEL ELEMENTS

(75) Inventors: Samuel Klassen, Haiger (DE); Heiko Holighaus, Eschenburg (DE)

(73) Assignee: Rittal RCS Communication Systems GmbH & Co. KG, Haiger (DE)

( * ) Notice: Subject to any disclaimer, the term of this patent is extended or adjusted under 35 U.S.C. 154(b) by 41 days.

(21) Appl. No.: 10/102,177

(22) Filed: Mar. 20, 2002

(65) Prior Publication Data

US 2002/0167250 A1 Nov. 14, 2002

(30) Foreign Application Priority Data

Mar. 21, 2001 (DE) .......................................... 101 13 936

(51) Int. Cl.⁷ .............................................. A47G 29/00
(52) U.S. Cl. .................................................. 312/265.2
(58) Field of Search ........................... 312/265.1, 265.2, 312/265.3, 265.4, 265.5, 257.1; 211/182, 183, 189, 26; 361/829

(56) References Cited

U.S. PATENT DOCUMENTS

| | | | | |
|---|---|---|---|---|
| 5,772,296 A | * | 6/1998 | Hartel et al. | ............. 312/265.1 |
| 5,930,972 A | * | 8/1999 | Benner et al. | .............. 52/653.1 |
| 5,971,511 A | * | 10/1999 | Diebel et al. | ............ 312/265.3 |
| 5,992,646 A | * | 11/1999 | Benner et al. | ................. 211/26 |
| 6,030,063 A | * | 2/2000 | Benner | ..................... 312/265.1 |
| 6,120,206 A | * | 9/2000 | Benner et al. | .............. 403/231 |
| 6,231,142 B1 | * | 5/2001 | Pochet | ..................... 312/265.3 |
| 6,273,533 B1 | * | 8/2001 | Nicolai et al. | ............ 312/265.1 |

FOREIGN PATENT DOCUMENTS

| | | | | |
|---|---|---|---|---|
| DE | 4036664 A1 | * | 5/1992 | ........... A47B/96/00 |
| EP | 751595 A2 | * | 1/1997 | ............. H02B/1/30 |
| JP | 11332031 A | * | 11/1999 | ............. H02B/1/30 |

OTHER PUBLICATIONS

Copending applications 10/102,563; 10/102,177; 10/102;562; 10/102,600 and 10/102,567 submitted by Applicant.*

* cited by examiner

Primary Examiner—Lanna Mai
Assistant Examiner—John Fitzgerald
(74) Attorney, Agent, or Firm—Pauley Petersen & Erickson

(57) ABSTRACT

A switchgear cabinet with a cuboid rack assembled from frame legs, wherein free spaces are formed in areas of the edges of the outer corners, for receiving folded edges of the panel elements meeting at the area. If at least the insides of the folded edges of the vertical panel elements are positioned at an angle of 45° with respect to the inside of the panel elements, then the outsides of the folded edges have a predetermined distance from the median line of the panel elements which meet each other in the area of the edge of the outside corner. Near the outer surfaces of the rack the inside surfaces of the panel elements rest directly on or by way of sealing elements on its frame legs. There is an increased security against vandalism in the area of all edges of the outer corners if the transition to the median line is symmetrically designed and if the panel elements and the cabinet doors are arbitrarily combined.

14 Claims, 1 Drawing Sheet

SWITCHGEAR CABINET WITH A RACK AND PANEL ELEMENTS

BACKGROUND OF THE INVENTION

1. Field of the Invention

This invention relates to a switchgear cabinet with a cuboid rack assembled from frame legs, wherein free spaces are formed in areas of the edges of the outer corners, for receiving folded edges of the panel elements meeting at the area.

2. Description of Related Art

With the known switchgear cabinets of this type, the edges of the panel elements are always folded at right angles and project into the free spaces of the rack in the area of the edges of the outer corners. A panel element with the folded edge is recessed with respect to the panel element which joins it vertically and is covered by the panel element. This leads to the formation of a closed front when switchgear cabinets are aligned with each other. However, in connection with a symmetrical rack of square cross section, two panel elements of different width are needed. Moreover, a gap remains between the free edge of the folded edge of the one panel element and the covering panel element in the area of the edges of the outer corners, to provide an attack point for a tool for forced removal of the panel elements. The paneling is not sufficiently secure against vandalism.

SUMMARY OF THE INVENTION

It is one object of this invention to provide a switchgear cabinet of the type mentioned above but wherein the panel elements, as well as the cabinet doors, have a uniform shape of the edges and wherein, with any arbitrary combination of panel elements and cabinet doors, only a narrow gap remains in the area of the edges of the outer corners, which also increases security against vandalism.

In accordance with this invention, this object is achieved because at least the insides of the folded edges of the vertical panel elements are placed at an angle of 45° with respect to the inside of the panel elements. The outsides of the folded edges have a predetermined distance from a median line of the panel elements which meet each other in the area of the edge of the outside corner. In the area of the outer surfaces of the rack the insides of the panel elements rest directly or via sealing elements on its frame legs.

In the case of a horizontally square rack, the panel elements, which are designed as stamped-and-bent elements, for the four vertical sides of the switchgear cabinet are even identical and meet each other in the area of the vertical edges of the outer corners only with a narrow gap between the folds, even if several switchgear cabinets are lined up with each other and form a front which is divided by similar narrow gaps. Because the gaps are bordered by the folds themselves and are laid out very narrow, a tool for lifting off the panel elements can no longer be effectively placed. Security against vandalism is definitely increased.

The distance of the folded edges of the panel elements from the median line between the outside planes of the rack and the gaps between lined up panel elements of adjoining switchgear cabinets can be maintained very small. In accordance with one embodiment, the panel elements meeting at right angles at the edges of the outer corners of the rack are arranged so that the planes of the insides of panel elements meeting at right angles intersect in the assigned edges of the outer corners of the rack, and are embodied so that the panel elements change into the folded edges by transitions in the shape of an arc of a circle of the approximate thickness of the panel element.

So that the panel elements meet each other at the same distance also at the horizontal edges of the outer corners, according to a further embodiment, the panel elements have folded edges at all four sides, which change into border edges in the area of the corners of the panel element and are located in the planes of the median line between the sides of the panel element and extend with the insides at an angle of 45° with respect to the inside of the panel element.

An embodiment provides for a switchgear cabinet which is to be opened and to be closed again. At least one panel element is embodied as a cabinet door, which has hinge elements on a vertical side between the folded edge and the inside. Complementary hinges are attached in the free space of the facing vertical frame leg of the rack. Similarly, locking elements are attached to the opposite vertical side of the cabinet door, and complementary locking elements on the assigned vertical frame leg.

In accordance with one embodiment, the open edges of the outer corners can be maintained narrow because the preselected distance between the outside of the folded edge and the median line between the outer planes of the rack meeting each other are less than the thickness of the panel elements.

According to a further embodiment, the edges of the horizontal sides of the panel elements are folded at right angles. At least the upper panel element having edges folded at right angles covers the adjoining vertical panel elements. The vertical gaps then extend over the entire height of the switchgear cabinet.

BRIEF DESCRIPTION OF THE DRAWINGS

This invention is explained in greater detail in view of embodiments represented in the drawings, wherein.

DESCRIPTION OF PREFERRED EMBODIMENTS

Figure 1:
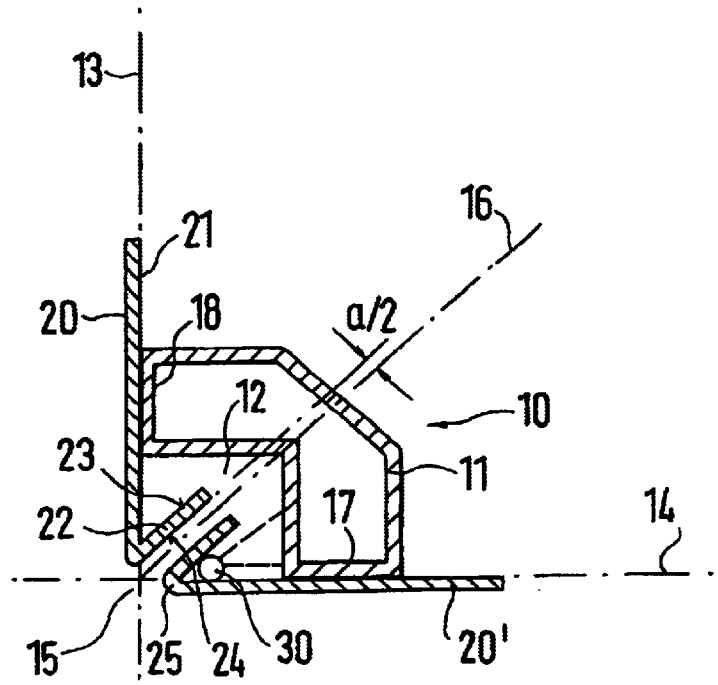
FIG. 1 is a horizontal partial cross section view taken through a vertical corner area of a rack, enclosed in panel elements, of a switchgear cabinet.

The partial cross section in FIG. 1 shows a vertical frame leg 11 of a cuboid rack 10, having outer planes 13 and 14 which meet each other at right angles and intersect at the virtual edge 15 of the outer corner. The frame leg 11 is designed laterally reversed with respect to the median line 16 and is located with the outsides of the profiled sides 17 and 18 in the outer planes 13 and 14 as the contact surfaces for the paneling elements 20 and 20' to be attached. The frame leg 11 forms a free space 12 in the direction of the outer edge 15. If the rack 10 is assembled from twelve profiled sections of identical cross section, the free space 12 extends over all edges of the outer corners, regardless of whether these extend vertically or horizontally. Racks 10 are also known in which the horizontal frame legs form a lower and upper frame and have different cross sections.

According to one embodiment of this invention, the vertical frame legs 11 and the panel elements 20 and 20', which meet each other, extend symmetrically with respect to the median line 16 in the area of the vertical edges 15 of the outer corners and close the outer edges, except for a narrow gap. For this reason, the vertical sides of the panel elements 20 and 20' have folded edges which extend at an angle of 45° with respect to the panel element 20 and 20' and parallel in respect to the median line 16, from which their outsides 24 are at a distance of a/2. Thus a gap of a width a is formed in the area of the vertical edges 15 of the outer corners, which can be maintained very narrow. For example, it can be less than the thickness D of the panel elements 20 and 20'. No tool for prying out the panel element 20 or 20', which are reinforced by means of the edge 22, can be effectively used in the gap of the width a. The edges 22 change over into the panel elements 20 and 20' via a transition 25 in the shape of an arc of a circle, so that when their insides 21 rest against the outsides of the profiled sides 17 and 18, they can approach as closely as possible to the edge 15 of the outer corner.

With a rack 10 of a square cross section, all four vertical panel elements 20 and 20' can be designed as uniform stamped-and-bent parts. The panel element 20' used as the cabinet door has hinge elements 30 in the area between the inside 23 of the edge 22 and the inside 21 of the panel element 20', which are attached in such a way that an opening angle of 90° or more is achieved, if possible. Thus it is necessary to make a compromise between the gap width and the opening angle. The complementary hinge elements for the cabinet door are then attached in the free space 12 of the assigned vertical frame leg 11.

At least the upper horizontal panel element can similarly have edges 22, which are folded at an angle of 45°, so that the horizontal edges 15 of the outer corners of the top of the switchgear cabinet are designed in accordance with FIG. 1. Nothing stands in the way of embodying the lower end of the switchgear cabinet in the same way. However, the lower and upper horizontal panel elements can also have edges folded at right angles and can cover the vertical panel elements 20 and 20'. Then it is advantageous if the horizontal sides of the vertical panel elements 20 and 20' also have edges folded at right angles, which are covered by the horizontal panel elements. In that case the gaps of the width a, which are formed in the area of the vertical edges at the outer corners, extend over the entire height of the switchgear cabinet.

If the horizontal sides of the vertical panel element 20 and 20', and all sides of the horizontal panel element, have the edges 22 folded at an angle of 45°, and if adhering to the alignment and arrangement in accordance with FIG. 1, a corner edge is formed in the corner area of the panel elements between the edges 22 meeting each other, which lies in the plane of the median line 16 of the panel element and extends at an angle of 45° with respect to the inside 21 of the panel element.

Figure 2:
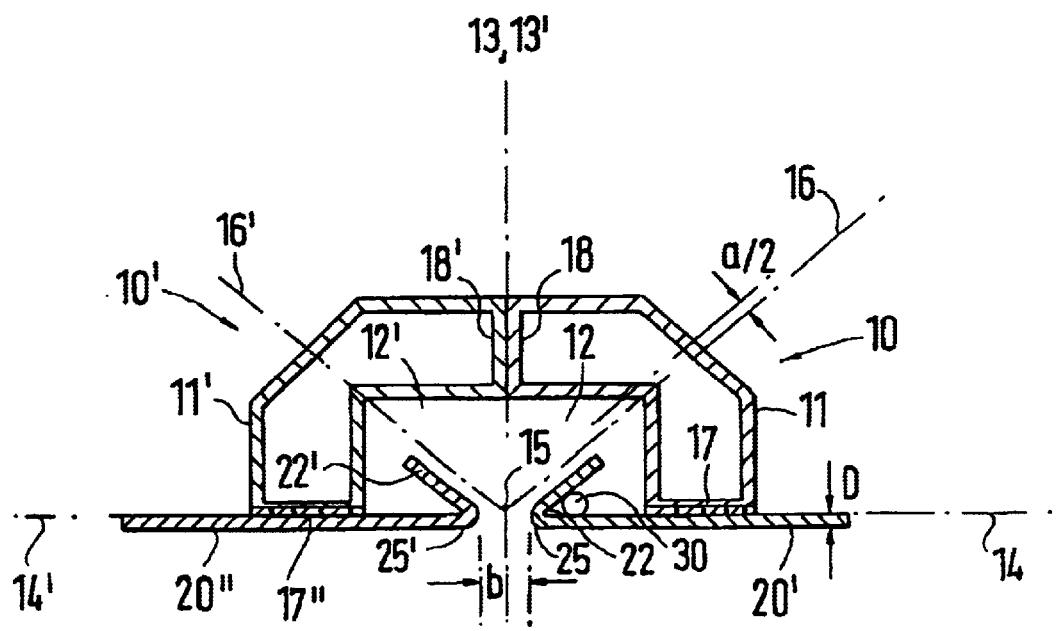
FIG. 2 is a horizontal partial cross section view taken through lined up corner areas of adjoining switchgear cabinets of a row of switchgear cabinets.

If two racks 10 and 10' are aligned directly next to each other, the facing outer planes 13 and 13' coincide, as shown in FIG. 2. The outsides of the profiled sides 18 and 18' rest on each other. The free spaces 12 and 12' are added together, and the edges 22 and 22' are at a distance a/2 with respect to the associated median line 16 and 16'. The transitions 25 and 25' delimit a defined gap of the width b in the front of the row of switchgear cabinets. The outer planes 14 and 14' of the racks 10 and 10' lie on a common plane, which also applies to the outsides of the panel elements 20 and 20', which are formed and hinged as cabinet doors in the front area of the row of switchgear cabinets. The oppositely located vertical side of the panel element 20 in the form of a cabinet door has locking elements, which work together with complementary locking elements attached to the facing vertical frame leg. The panel element 20" rests against the outside of the profiled side 17' of the frame leg 11'.

Because the cabinet doors and the panel elements have identical edges, these can be freely attached to the outsides of the rack, for example they can be freely combined. If the rack is square in cross section, uniform stamped-and-bent sheet metal elements are used for the vertical panel elements and cabinet doors.

The edges of the panel element and the cabinet doors can be further reinforced if the edges 22 are bent inward at their free ends, in the direction of the associated panel element or cabinet door.

German Patent Reference 101 13 936.5-34 and its teachings are incorporated, by reference, into this specification.

What is claimed is:

1. In a switchgear cabinet having a cuboid rack assembled from frame legs, wherein free spaces are formed in areas of edges of outer corners for receiving folded edges of the meeting panel elements, the improvement comprising:

at least insides (23) of the folded edges (22, 22') of the panel elements (20, 20', 20") positioned at an angle of 45° with respect to a corresponding one of inside surfaces (21) of the panel elements (20, 20', 20"), outsides (24) of the folded edges (22, 22') having a predetermined distance (a/2) from a virtual median line (16) of the panel elements (20, 20') meeting each other near the edges (15) of the outside corner, and near the outer surfaces (13, 14) of the rack (10, 10') the inside surfaces (21) of the panel elements (20, 20', 20") resting one of directly on and by way of sealing elements on the corresponding frame legs (11, 11').

2. In the switchgear cabinet in accordance with claim 1, wherein the panel elements (20, 20', 20") merge into the folded edges (22) with transitions (25) shaped as an arc of a circle of an approximate thickness (D) of each of the panel elements (20, 20', 20").

3. In the switchgear cabinet in accordance with claim 1, wherein the panel elements (20, 20', 20") have folded edges (22) located in planes of the virtual median lines (16, 16') between sides of the panel elements (20, 20', 20") and extend with insides (23) at an angle of 45° with respect to corresponding ones of the inside surfaces (21) of the panel elements (20, 20', 20").

4. In the switchgear cabinet in accordance with claim 1, wherein at least one of the panel elements (20') is embodied as a cabinet door, with hinge elements (30) on a vertical side between one of the folded edges (22) and one of the inside surfaces (21), with complementary hinges attached in the free space (12) of one of the vertical frame legs (11) of the rack (10).

5. In the switchgear cabinet in accordance with claim 1, wherein the preselected distance (a/2) between the outsides (24) of the folded edges (22) and the virtual median line (16) between the outer planes (13, 14) of the rack (10) meeting each other are less than a thickness (D) of each of the panel elements (20, 20', 20").

6. In the switchgear cabinet in accordance with claim 1, wherein the folded edges (22) are folded at right angles.

7. In the switchgear cabinet in accordance with claim 1, wherein on free ends the folded edges (22, 22') of the panel elements (20, 20') and cabinet doors are folded over.

8. In the switchgear cabinet in accordance with claim 1, wherein planes defined by the inside surfaces (21) of the panel elements (20, 20') meeting at right angles in the corresponding edges (15) of the outer corners of the rack (10, 10').

9. In the switchgear cabinet in accordance with claim 8, wherein the panel elements (20, 20', 20") merge into the folded edges (22) with transitions (25) shaped as an arc of a circle of an approximate thickness (D) of each of the panel elements (20, 20', 20").

10. In the switchgear cabinet in accordance with claim 9, wherein the panel elements (20, 20', 20") have folded edges (22) located in the planes of the virtual median lines (16, 16') between sides of the panel elements (20, 20', 20") and extend with insides (23) at an angle of 45° with respect to corresponding ones of the inside surfaces (21) of the panel elements (20, 20', 20").

11. In the switchgear cabinet in accordance with claim 9, wherein the folded edges (22) are folded at right angles.

12. In the switchgear cabinet in accordance with claim 11, wherein on free ends the folded edges (22, 22') of the panel elements (20, 20') and cabinet doors are folded over.

13. In the switchgear cabinet in accordance with claim 10, wherein at least one of the panel elements (20') is embodied as a cabinet door, with hinge elements (30) on a vertical side between one of the folded edges (22) and one of the inside surfaces (21), with complementary hinges attached in the free space (12) of one of the vertical frame legs (11) of the rack (10).

14. In the switchgear cabinet in accordance with claim 13, wherein the preselected distance (a/2) between the outsides (24) of the folded edges (22) and the median line (16) between the outer planes (13, 14) of the rack (10) meeting each other are less than the thickness (D) of each of the panel elements (20, 20', 20").

* * * * *